United States Patent [19]

Fukuda et al.

[11] Patent Number: 5,656,711
[45] Date of Patent: Aug. 12, 1997

[54] CURABLE COMPOSITIONS

[75] Inventors: Kenichi Fukuda; Hitoshi Kinami; Shinichi Sato; Yasuo Tarumi; Masatoshi Arai, all of Usui-gun, Japan

[73] Assignee: Shin-Etsu Chemical Co., Ltd., Tokyo, Japan

[21] Appl. No.: 721,455

[22] Filed: Sep. 27, 1996

[30] Foreign Application Priority Data

Sep. 29, 1995 [JP] Japan ..................... 7-276939

[51] Int. Cl.$^6$ ..................... C08G 77/04
[52] U.S. Cl. ............... 528/15; 528/31; 528/32; 528/42
[58] Field of Search ............ 528/15, 31, 32, 528/42

[56] References Cited

U.S. PATENT DOCUMENTS

| | | | |
|---|---|---|---|
| 4,100,136 | 7/1978 | Carter et al. | 528/15 |
| 5,208,312 | 5/1993 | Boutevin et al. | 528/28 |
| 5,300,613 | 4/1994 | Kishita et al. | 528/26 |
| 5,352,752 | 10/1994 | Koike et al. | 528/26 |
| 5,380,811 | 1/1995 | Kishita et al. | 528/42 |
| 5,416,183 | 5/1995 | Sato et al. | 528/15 |
| 5,475,078 | 12/1995 | Sato et al. | 528/16 |

*Primary Examiner*—Ralph H. Dean
*Attorney, Agent, or Firm*—Millen White Zelano and Branigan, P.C.

[57] ABSTRACT

In a curable composition comprising (A) a fluorinated amide compound, (B) a fluorinated organohydrogensiloxane having at least one monovalent perfluorooxyalkyl, monovalent perfluoroalkyl, divalent perfluorooxyalkylene or divalent perfluoroalkylene group, and at least two hydrosilyl groups in a molecule, and (C) a platinum catalyst is blended a tackifier (D) in the form of an organosiloxane having at least one hydrogen atom directly attached to a silicon atom and at least one epoxy or trialkoxysilyl group attached to a silicon atom through a carbon atom or a carbon atom and an oxygen atom. The composition cures into a cured product which exhibits satisfactory properties and firmly bonds to metallic and plastic substrates by brief heating at low temperature.

6 Claims, No Drawings

5,656,711

CURABLE COMPOSITIONS

BACKGROUND OF THE INVENTION

1. Field of the Invention

This invention relates to a curable composition of the addition reaction type and more particularly, to a curable composition which cures into a fluorinated elastomer having improved adhesion to various substrates.

2. Prior Art

Curable fluorinated elastomer compositions comprising a polymeric fluorinated organic compound and a crosslinking agent have been used in a variety of applications.

Currently available fluorinated elastomer compositions cure into products which have solvent resistance, chemical resistance, heat resistance, low-temperature performance and low moisture permeability as rubber material, but do not firmly bond to substrates kept in contact therewith during curing. That is, these compositions lack adhesion to substrates.

Therefore, an object of the present invention is to provide a curable composition which cures into a fluorinated elastomer having improved adhesion to various substrates.

SUMMARY OF THE INVENTION

We have found that when a fluorinated amide compound of the general formula (1) shown below is blended with a fluorinated organosiloxane as a crosslinking and chain extending agent, a platinum group compound as a catalyst, and an organosiloxane having at least one hydrogen atom directly attached to a silicon atom (that is, SiH group) and an epoxy group and/or trialkoxysilyl group each attached to a silicon atom through a carbon atom or a carbon atom and an oxygen atom, and optionally further having a fluoroalkyl group or perfluoropolyether group, there is obtained a curable composition which cures into a fluorinated elastomer having solvent resistance, chemical resistance, heat resistance, low-temperature performance, low moisture permeability, and improved adhesion to various substrates.

The present invention provides a curable composition comprising (A) a fluorinated amide compound of the following general formula (1), (B) an amount of a fluorinated organohydrogensiloxane having at least one group selected from the class consisting of a monovalent perfluorooxyalkyl, monovalent perfluoroalkyl, divalent perfluorooxyalkylene, and divalent perfluoroalkylene group, and at least two hydrosilyl groups in a molecule, (C) a catalytic amount of a platinum group compound, and (D) an organosiloxane having at least one hydrogen atom directly attached to a silicon atom and at least one of an epoxy group and a trialkoxysilyl group each attached to a silicon atom through a carbon atom or a carbon atom and an oxygen atom in a molecule. The total amount of organohydrogensiloxane (B) and organosiloxane (D) is such that 0.5 to 5 mol of the hydrosilyl (SiH) group is available per mol of an aliphatic unsaturated group in the composition.

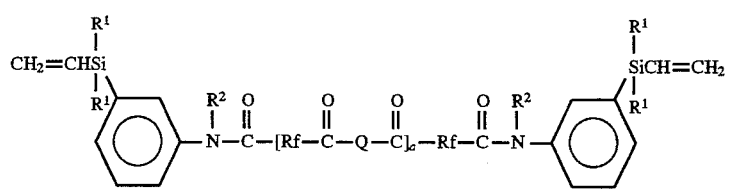

$R^1$ is a substituted or unsubstituted monovalent hydrocarbon group, $R^2$ is a hydrogen atom or substituted or unsubstituted monovalent hydrocarbon group, Q is a group represented by the following general formula (2) or (3):

wherein $R^2$ is as defined above, $R^3$ is a substituted or unsubstituted divalent hydrocarbon group which may be separated by at least one of an oxygen atom, nitrogen atom and silicon atom, $R^4$ and $R^5$ each are a substituted or unsubstituted divalent hydrocarbon group, Rf is a divalent perfluoroalkylene or perfluoropolyether group, and letter a is an integer inclusive of 0.

DETAILED DESCRIPTION OF THE INVENTION

More particularly, the curable composition of the invention comprises (A) a fluorinated amide compound of formula (1) as a base polymer, (B) a fluorinated organohydrogensiloxane as a crosslinking and chain extending agent, (C) a platinum group compound as a catalyst, and (D) an organosiloxane as a tackifier.

A first essential component or component (A) is a fluorinated amide compound. This fluorinated amide compound is represented by formula (1).

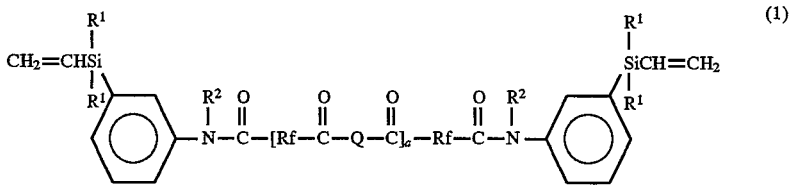

R¹ is a substituted or unsubstituted monovalent hydrocarbon group, preferably having 1 to 10 carbon atoms, especially 1 to 8 carbon atoms, and preferably free of an aliphatic unsaturated bond. Examples include alkyl groups such as methyl, ethyl, propyl, isopropyl, butyl, isobutyl, tert-butyl, pentyl, hexyl, octyl, and decyl; cycloalkyl groups such as cyclopentyl, cyclohexyl, and cycloheptyl; alkenyl groups such as vinyl, allyl, propenyl, isopropenyl, butenyl, and hexenyl; aryl groups such as phenyl, tolyl, xylyl, and naphthyl; aralkyl groups such as benzyl, phenylethyl, and phenylpropyl; and substituted ones of these groups wherein some or all of the hydrogen atoms are replaced by halogen atoms or the like, typically fluorinated alkyl groups such as chloromethyl, chloropropyl, bromoethyl, 3,3,3-trifluoropropyl, and 6,6,6,5,5,4,4,3,3-nonafluorohexyl.

$R^2$ is a hydrogen atom or substituted or unsubstituted monovalent hydrocarbon group, preferably having 1 to 10 carbon atoms, especially 1 to 8 carbon atoms, and preferably free of an aliphatic unsaturated bond. Exemplary monovalent hydrocarbon groups are the same as those mentioned for $R^1$. Preferred examples include alkyl groups such as methyl, ethyl, propyl, and isopropyl; cycloalkyl groups such as cyclohexyl; alkenyl groups such as vinyl and allyl; aryl groups such as phenyl and tolyl; and substituted ones of these groups wherein some of the hydrogen atoms are replaced by halogen atoms or the like, typically fluorinated alkyl groups such as chloromethyl, chloropropyl, 3,3,3-trifluoropropyl, and 6,6,6,5,5,4,4,3,3-nonafluorohexyl.

Q is a group represented by the following general formula (2) or (3).

$R^2$ is as defined above. $R^3$ is a substituted or unsubstituted divalent hydrocarbon group, preferably having 1 to 20 carbon atoms, especially 2 to 10 carbon atoms. Examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; and substituted ones of these groups wherein some of the hydrogen atoms are replaced by halogen atoms or the like; and combinations of such substituted or unsubstituted alkylene and/or arylene groups.

The hydrocarbon group represented by $R^3$ may contain at least one of an oxygen atom, nitrogen atom and silicon atom midway its linkage. In this case, the oxygen atom is interposed in the form of —O—. The nitrogen atom is interposed in the form of —NR'— wherein R' is a hydrogen atom or an alkyl group having 1 to 8 carbon atoms, especially 1 to 6 carbon atoms or aryl group. The silicon atom is interposed in the form of a group containing a linear or cyclic organosiloxane as shown below or an organosilylene group.

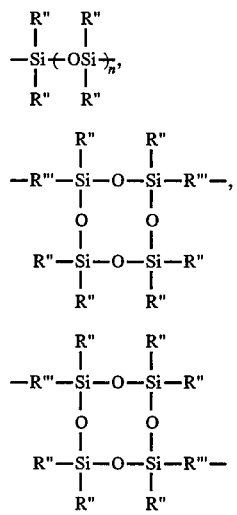

R" is an alkyl group having 1 to 8 carbon atoms or an aryl group as previously exemplified for $R^1$ and $R^2$. R'" is an alkylene group having 1 to 6 carbon atoms or an arylene group as previously exemplified for $R^3$. Letter n is an integer of 0 to 10, especially 0 to 5.

Examples of the group having an intervening oxygen, nitrogen or silicon atom are shown below. Note that Me is methyl.

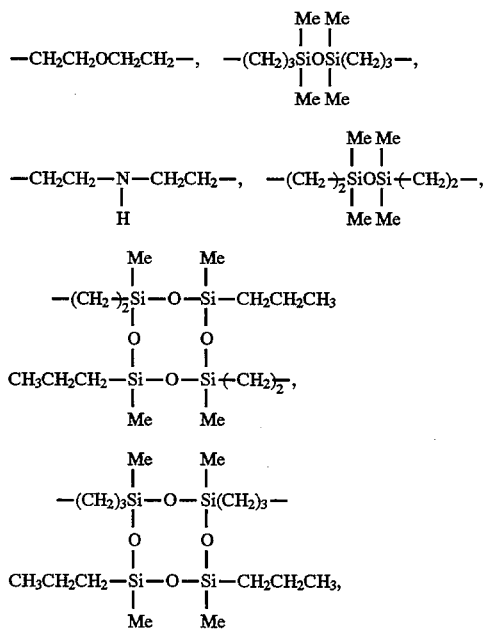

-continued

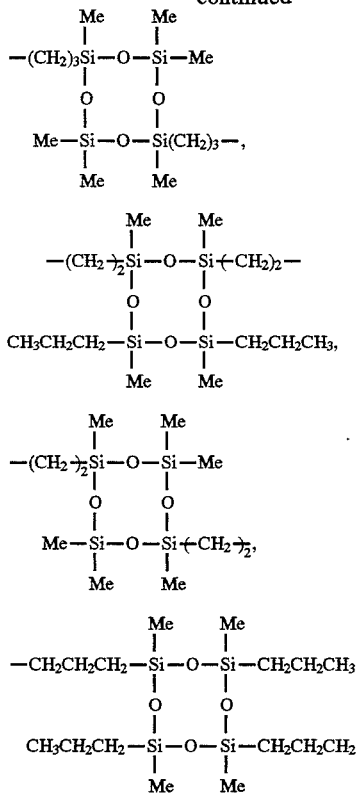

In formula (3), $R^4$ and $R^5$ each are a substituted or unsubstituted divalent hydrocarbon group, preferably having 1 to 10 carbon atoms, especially 2 to 6 carbon atoms. Examples include alkylene groups such as methylene, ethylene, propylene, methylethylene, butylene, and hexamethylene; cycloalkylene groups such as cyclohexylene; and substituted ones of these groups wherein some of the hydrogen atoms are replaced by halogen atoms or the like.

Examples of Q represented by formula (2) or (3) are given below. Note that Me is methyl, Ph is phenyl, Rf is defined below, and X is hydrogen, methyl or phenyl.

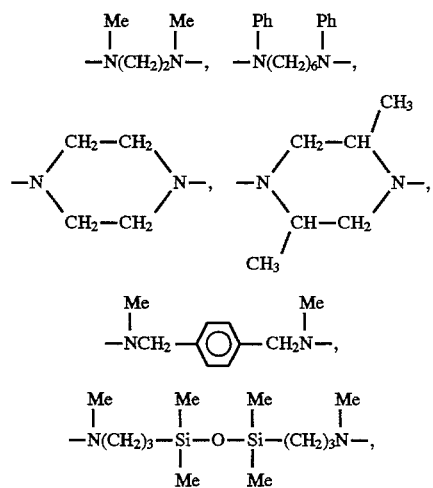

-continued

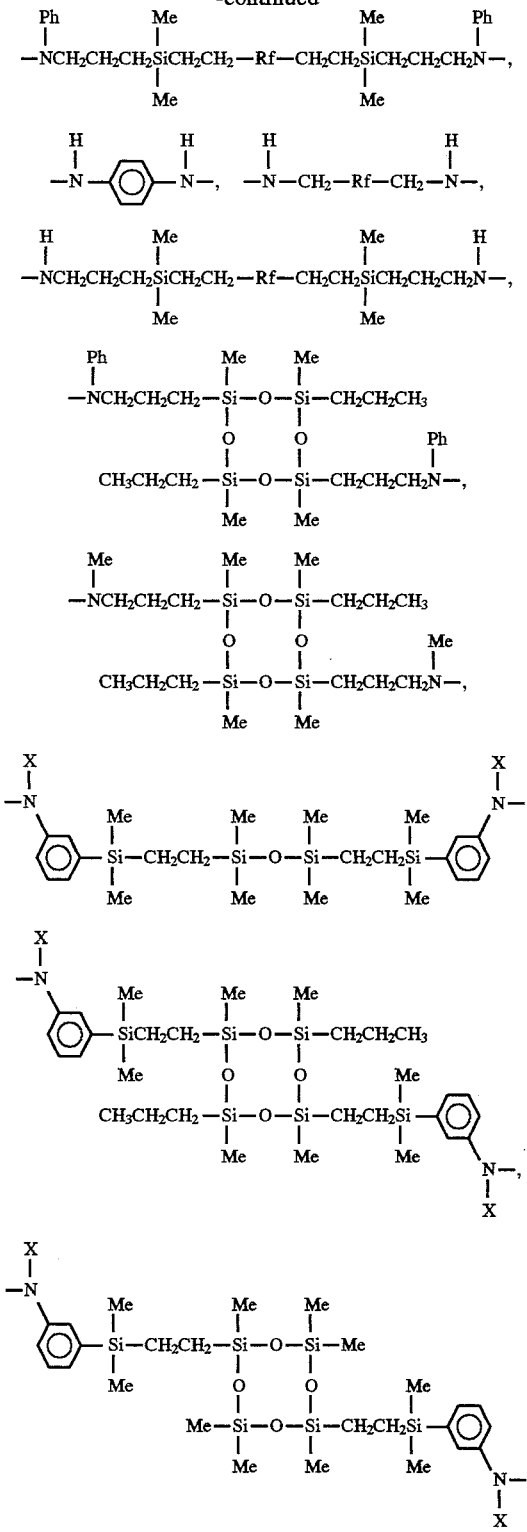

In formula (1), Rf is a divalent perfluoroalkylene or divalent perfluoropolyether group. The preferred divalent perfluoroalkylene groups are represented by $-C_mF_{2m}-$ wherein m is an integer of 1 to 10, especially 2 to 6. The preferred divalent perfluoropolyether groups are represented by the following formulae:

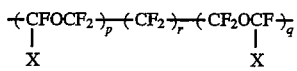

wherein X is F or CF$_3$ group, p, q and r are integers in the range: p≧1, q≧1, and 2≦p+q≦200, especially 2≦p+q≦110 and 0≦r≦6,

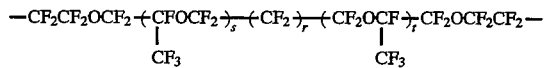

wherein r, s and t are integers in the range: 0≦r≦6, s≧0, t≧0, and 0≦s+t≦200, especially 2≦s+t≦110,

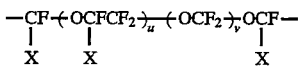

wherein X is F or CF$_3$ group, u and v are integers in the range: 1≦u≦20 and 1≦v≦20, and

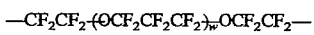

wherein w is an integer in the range: 1≦w≦100.

Examples of Rf are given below.

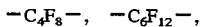

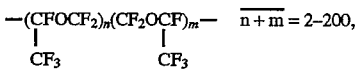

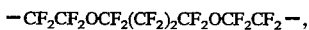

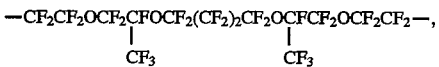

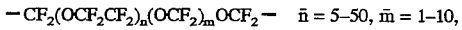

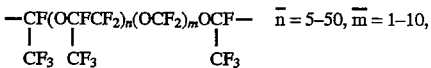

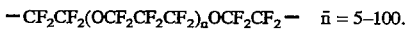

In formula (1), letter a is an integer inclusive of 0. The fluorinated amide compound of formula (1) contains at least one divalent perfluoroalkylene or perfluoropolyether group while letter a is preferably an integer of 0 to 10, more preferably equal to 1, 2, 3, 4, 5 or 6.

The fluorinated amide compounds of formula (1) may be used in various forms covering from low viscosity polymers having a viscosity of several tens of centistokes at 25° C. to solid raw rubber-like polymers. For ease of handling, raw rubber-like polymers are preferred for the intended application as heat vulcanizable rubber and polymers having a viscosity of about 100 to about 100,000 centistokes at 25° C. are preferred for the intended application as liquid rubber. Too low viscosity would be undesirable because cured products would have low elongation as elastomers and imbalance of physical properties.

The fluorinated amide compounds of formula (1) can be obtained by the following method. The fluorinated amide compound of formula (1) wherein letter a is equal to 0 can be synthesized by reacting a compound having an acid fluoride group at either end of the following general formula (4) with a primary or secondary amine compound of the following general formula (5) in the presence of an acid acceptor such as trimethylamine.

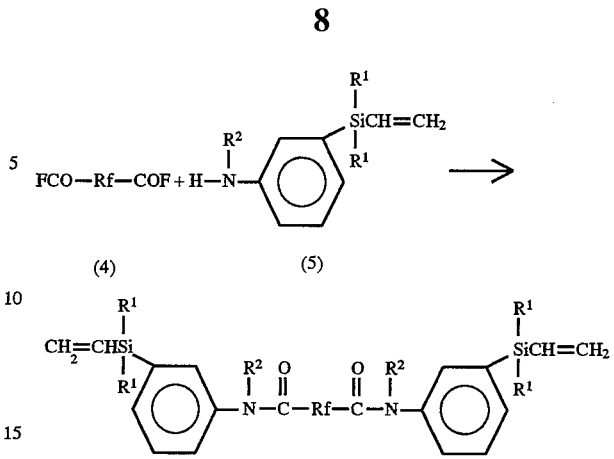

Note that R$^1$, R$^2$ and Rf are as defined previously.

Also the fluorinated amide compound of formula (1) wherein letter a is an integer of at least 1 can be synthesized by reacting a compound having an acid fluoride group at either end of formula (4) with a diamine of the following general formula (6):

wherein Q is as defined previously in the presence of an acid acceptor and further reacting with a primary or secondary amine compound of formula (5).

Although the compound having an acid fluoride group at either end of formula (4) and the primary or secondary amine compound of formula (5) may be used in an desired ratio, it is preferred that the molar ratio of the charge (a) of the formula (4) compound to the charge (b) of the formula (5) compound, (a)/(b), range from 0.1 mol/mol to 1.2 mol/mol, especially from 0.2 mol/mol to 0.5 mol/mol.

Also the compound of formula (4) and the compound of formula (6) are mixed such that the molar charge (a) of the formula (4) compound is not less than the molar charge (c) of the formula (6) compound. The number (represented by a) of recurring units in formula (1) may be controlled to an appropriate value by adjusting the molar ratio (a)/(c). Higher values of (a)/(c) allow for synthesis of polymers having a relatively low molecular weight whereas molar ratios (a)/(c) approximating to 1 allow for synthesis of polymers having a high molecular weight.

Reaction conditions are not critical. Preferred conditions include a temperature of 20° to 100° C. and a time of about 1 to 8 hours, more preferably a temperature of 20° to 50° C. and a time of about 2 to 4 hours.

Among the fluorinated amide compounds of formula (1), those fluorinated amide compounds wherein Q is a group having an intervening silicon atom can be synthesized by selecting an amine compound of formula (5) as a primary or secondary amine compound having an aliphatic unsaturated group such as vinyl and allyl, subjecting it to the above-mentioned reaction to form a compound having a vinyl group at either end of the following general formula (7), and further reacting the compound of formula (7) with a compound having two hydrosilyl groups in a molecule of the following general formula (8) in the presence of an addition reaction catalyst.

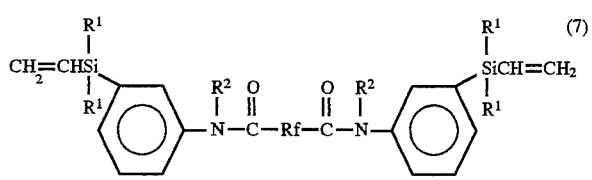

Note that $R^1$, $R^2$ and Rf are as previously defined.

$$H-P-H \quad (8)$$

Note that P represents a divalent organic group having a siloxane bond as exemplified below.

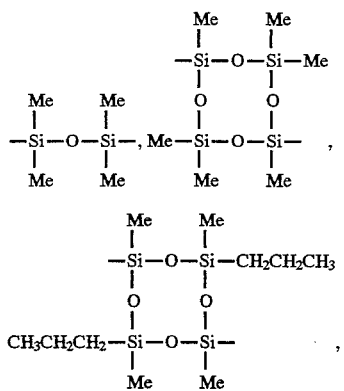

In this reaction, the compound having a vinyl group at either end of formula (7) and the compound of formula (8) are mixed such that the molar charge (d) of the formula (7) compound does not exceed the molar charge (e) of the formula (8) compound. The molar ratio (d)/(e) is at most 2. That is, $1<(d)/(e)\leq 2$. Within this range, higher values of (d)/(e) allow for synthesis of polymers having a relatively low molecular weight whereas molar ratios (d)/(e) approximating to 1 allow for synthesis of polymers having a high molecular weight.

The catalyst used herein is selected from the elements of Group VIII in the Periodic Table and compounds thereof, for example, chloroplatinic acid, alcohol-modified chloroplatinic acid (see U.S. Pat. No. 3,220,972), complexes of chloroplatinic acid with olefins (see U.S. Pat. Nos. 3,159,601, 3,159,662 and 3,775,452), platinum black and palladium on supports such as alumina, silica and carbon, rhodium-olefin complexes, and chlorotris (triphenylphosphine)rhodium (Wilkinson catalyst). It is used in a catalytic amount. The complexes are preferably used as solution in suitable solvents such as alcohol, ketone, ether and hydrocarbon solvents.

Preferably the reaction is effected at about 50° to 150° C., especially about 80° to 120° C., for about 2 to 4 hours.

A second essential component or component (B) of the inventive curable composition is a fluorinated organohydrogensiloxane which serves as a crosslinking agent and chain extender for the fluorinated amide compound (A). The fluorinated organohydrogensiloxane (B) should contain at least one monovalent perfluorooxyalkyl, monovalent perfluoroalkyl, divalent perfluorooxyalkylene or divalent perfluoroalkylene group and at least two, preferably at least three hydrosilyl (SiH) groups in a molecule. The perfluorooxyalkyl, perfluoroalkyl, perfluorooxyalkylene and perfluoroalkylene groups are preferably those represented by the following general formulae:

Monovalent perfluoroalkyl group:

$$C_mF_{2m+1}-$$

m is an integer of 1 to 20, preferably 2 to 10.

Divalent perfluoroalkylene group:

$$-C_mF_{2m}-$$

m is an integer of 1 to 20, preferably 2 to 10.

Monovalent perfluorooxyalkyl group:

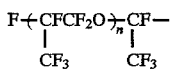

n is an integer of 1 to 5.

Divalent perfluorooxyalkylene group:

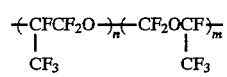

m+n is an integer of 2 to 100 on average.

The fluorinated organohydrogensiloxanes may be of cyclic or linear structure or three-dimensional network. They preferably have at least one monovalent or divalent organic group having a perfluoroalkyl, perfluoroalkyl ether or perfluoroalkylene group of the following general formula in a molecule as a monovalent or divalent substituent attached to a silicon atom.

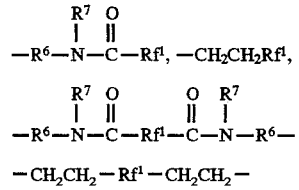

In the formulae, $R^6$ is a divalent hydrocarbon group, preferably having 1 to 10 carbon atoms, especially 2 to 6 carbon atoms, for example, alkylene groups such as methylene, ethylene, propylene, methylethylene, tetramethylene, and hexamethylene, and arylene groups such as phenylene, $R^7$ is a hydrogen atom or a monovalent hydrocarbon group, preferably having 1 to 8 carbon atoms, more preferably 1 to 6 carbon atoms as defined for $R^2$, and $Rf^1$ is a monovalent perfluoroalkyl, monovalent perfluorooxyalkyl, divalent perfluorooxyalkylene or divalent perfluoroalkylene group as previously exemplified.

The fluorinated organohydrogensiloxane (B) has a monovalent substituent group attached to a silicon atom other than the monovalent organic group having a mono- or divalent fluorinated substituent (i.e., perfluoroalkyl, perfluorooxyalkyl, perfluorooxyalkylene or perfluoroalkylene group). Examples of the other substituent group include monovalent hydrocarbon groups preferably having 1 to 10 carbon atoms, more preferably 1 to 8 carbon atoms and preferably free of an aliphatic unsaturated bond,° as previously defined for $R^2$.

The number of silicon atoms per molecule of the fluorinated organohydrogensiloxane is not critical although it generally has about 2 to about 60, preferably about 4 to about 30 silicon atoms.

Examples of the fluorinated organohydrogensiloxane are given below. They may be used alone or in admixture of two or more. Note that Me is methyl and Ph is phenyl.

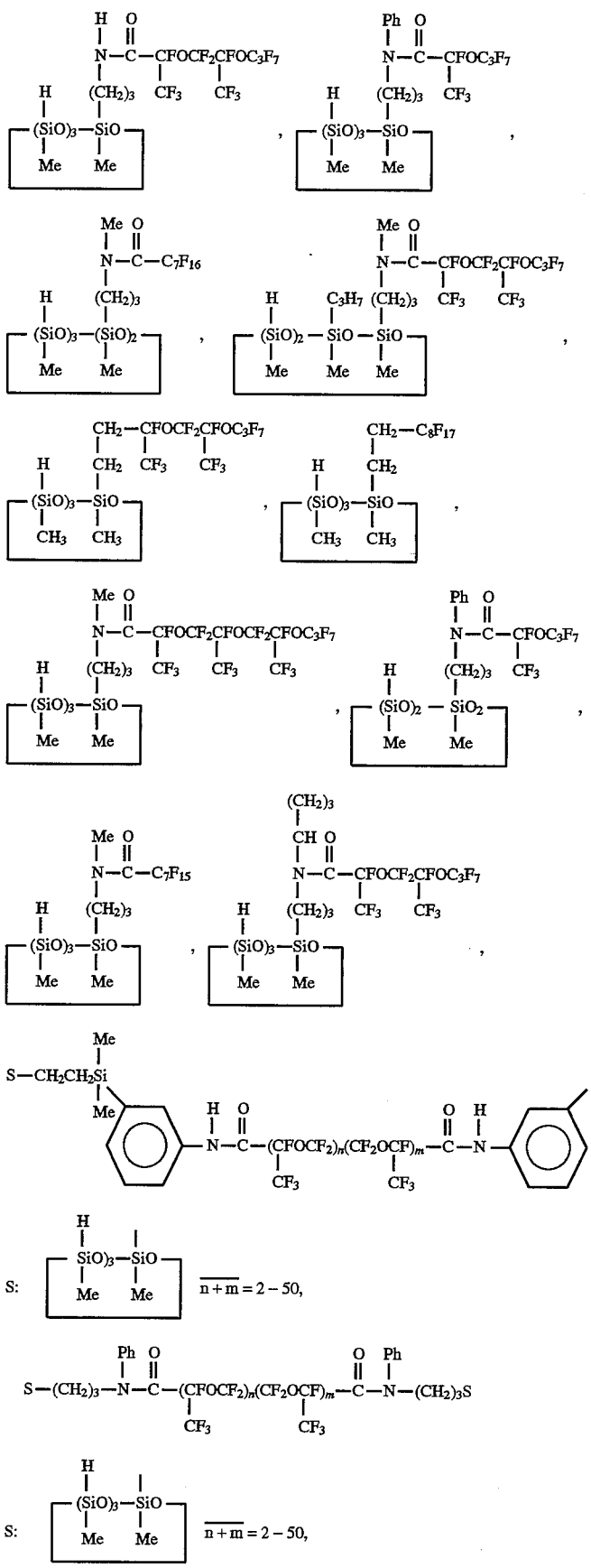

-continued

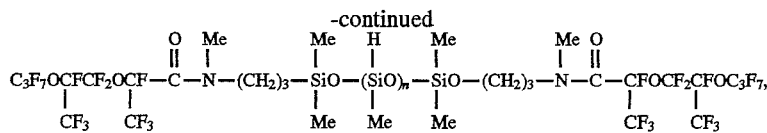

$\bar{n} = 3 - 50$

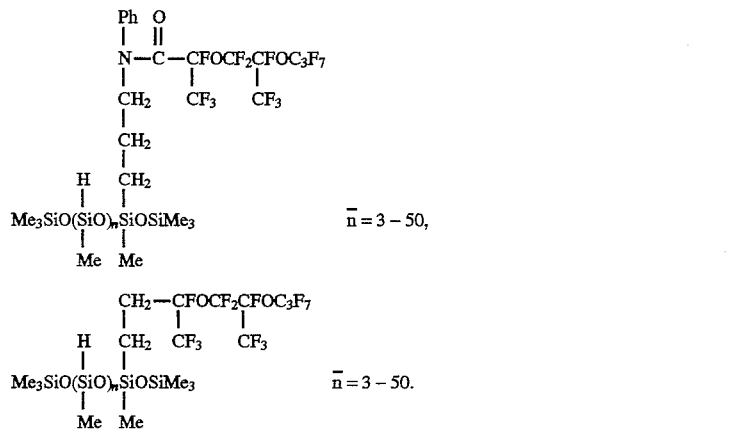

When the fluorinated organohydrogensiloxane used as component (B) is compatible with the fluorinated amide compound as component (A), the resulting curable composition will yield a uniform cured product.

Component (B) is blended in the composition in such an amount as to provide 0.5 to 5 mol, preferably 1 to 2 mol of the hydrosilyl group (i.e., SiH group) in component (B) and component (D) per mol of the aliphatic unsaturated group (e.g., vinyl, allyl and cycloalkenyl groups) in the entire composition, especially component (A). Less than 0.5 mol of the hydrosilyl group on this basis will lead to an insufficient degree of crosslinking. With more than 5 mol of the hydrosilyl group, chain lengthening will become predominant, resulting in short curing or foaming and adversely affecting heat resistance and compression set. Most often, components (A) and (B) are blended such that about 0.1 to 50 parts by weight of component (B) is available per 100 parts by weight of component (A).

The curable composition further contains a platinum group compound as a third essential component (C). It is a catalyst for catalyzing addition reaction or hydrosilylation between the fluorinated amide compound and the fluorinated organohydrogensiloxane, that is, serves as a curing promoter. Since the platinum group compounds are generally compounds of noble metals and expensive, relatively easily available platinum compounds are often used.

Illustrative, non-limiting examples of the platinum compound include chloroplatinic acid, complexes of chloroplatinic acid with olefins such as ethylene, complexes of chloroplatinic acid with alcohols or vinylsiloxanes, and platinum on silica, alumina and carbon. Platinum group compounds other than the platinum compounds are also useful. Known examples include compounds of rhodium, ruthenium, iridium, and palladium, for example, such as RhCl(PPh$_3$)$_3$, RhCl(CO)(PPh$_3$)$_2$, RhCl(C$_2$H$_4$)$_2$, Ru$_3$(CO)$_{12}$, IrCl(CO)(PPh$_3$)$_2$, and Pd(PPh$_3$)$_4$ wherein Ph is phenyl.

On use, these catalysts may be used in solid form if they are solid catalysts. In order to form more uniform cured products, a solution of chloroplatinic acid or its complex in a suitable solvent is preferably used as a miscible mixture with the fluorinated amide compound (A).

The amount of the catalyst used is not critical. A desired curing rate will be achieved with a catalytic amount. From an economical point of view or to produce satisfactory cured products, the catalyst is preferably added in an amount of about 1 to 1,000 ppm, more preferably about 10 to 500 ppm of platinum group element based on the weight of the entire curable composition.

A fourth essential component or component (D) is an organosiloxane which when blended in the composition, permits the composition to develop self tackiness. The organosiloxane (D) should have in a molecule (i) at least one hydrogen atom directly attached to a silicon atom (i.e., SiH group) and (ii) at least one of an epoxy group and a trialkoxysilyl group each attached to a silicon atom through a carbon atom or a carbon atom and an oxygen atom. Preferably, the organosiloxane should further have (iii) at least one of a fluoroalkyl group and perfluoropolyether group each attached to a silicon atom through a carbon atom in a molecule.

The organosiloxane has a siloxane skeleton which may be cyclic, linear or branched or a mixture thereof. Preferred organosiloxanes are represented by the following average compositional formulae.

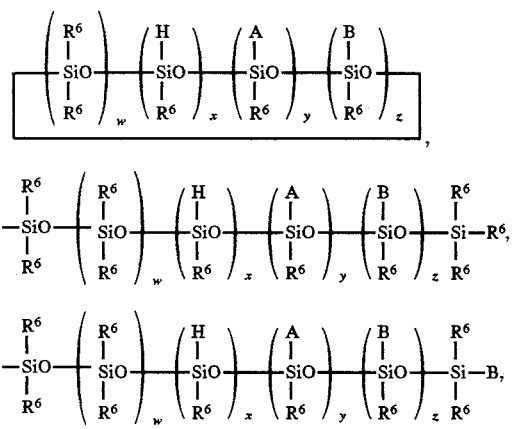

R$^6$ is a substituted or unsubstituted monovalent hydrocarbon group as previously defined for R$^1$. A is an epoxy group and/or a trialkoxysilyl group each attached to a silicon atom through a carbon atom or a carbon atom and an oxygen atom. B is a perfluoroalkyl group or perfluoroether group each attached to a silicon atom through a carbon atom.

Examples of A are those groups represented by

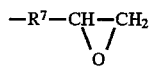

wherein $R^7$ is a divalent hydrocarbon group having 1 to 10 carbon atoms, especially 1 to 5 carbon atoms, which may contain an intervening oxygen atom, for example, alkylene and cycloalkylene groups, and

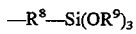

wherein $R^8$ is a divalent hydrocarbon group having 1 to 10 carbon atoms, especially 1 to 4 carbon atoms, for example, alkylene groups, and $R^9$ is a monovalent hydrocarbon group having 1 to 8 carbon atoms, especially 1 to 4 carbon atoms, for example, alkyl groups.

Examples of B are those groups represented by

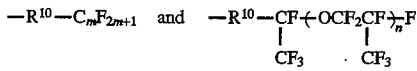

wherein $R^{10}$ is a group as defined for $R^8$ or a group represented by

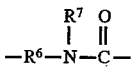

wherein $R^6$ and $R^7$ are as defined above, and letters m and n are as defined above.

Letters w, x, and z are integers inclusive of 0, y is an integer of at least 1. The sum of w+x+y+z is generally 2 to about 60, preferably 4 to about 30. In the case of a cyclic siloxane structure, the siloxane ring preferably consists of 3 to about 50 silicon atoms from the standpoint of ease of synthesis.

These organosiloxanes can be prepared by effecting partial addition reaction between an organohydrogenpolysiloxane having at least three hydrogen atoms each attached to a silicon atom (SiH groups) in a molecule and a compound having an aliphatic unsaturated group such as vinyl and allyl and an epoxy group and/or trialkoxysilyl group and optionally a compound having an aliphatic unsaturated group and a fluoroalkyl group or perfluoroether group in a conventional manner. The number of aliphatic unsaturated groups should be less than the number of SiH groups. At the end of reaction, the end product may be isolated for subsequent use. The reaction mixture may also be used insofar as the unreacted reactants and addition reaction catalyst are removed.

Examples of the organosiloxane (D) are represented by the following structural formulae.

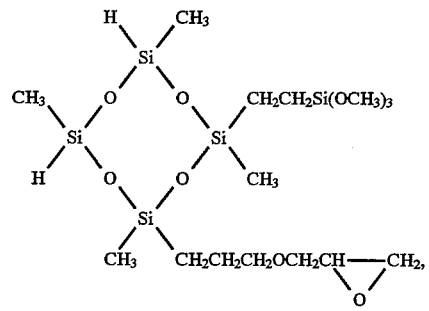

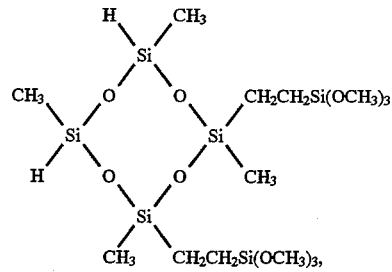

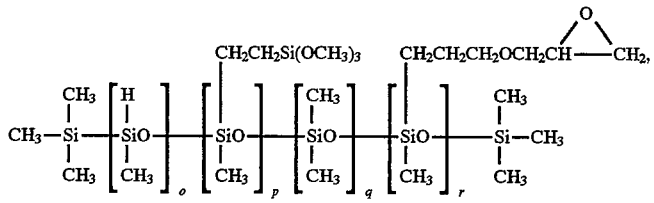

(o, q and r are positive integers p is an integer inclusive of 0.)

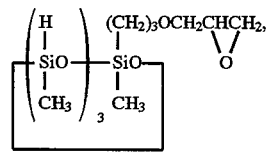

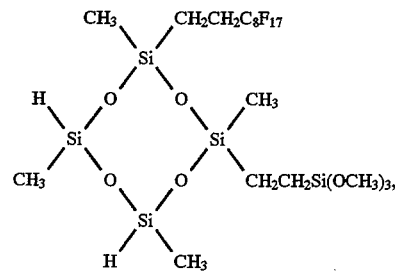

-continued

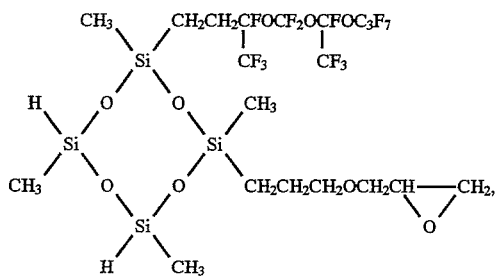

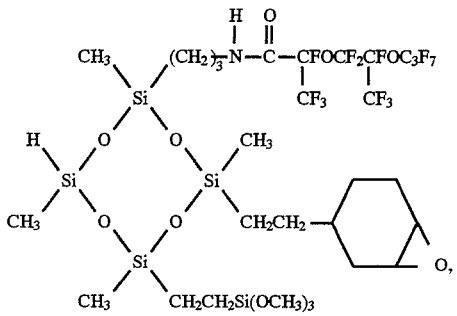

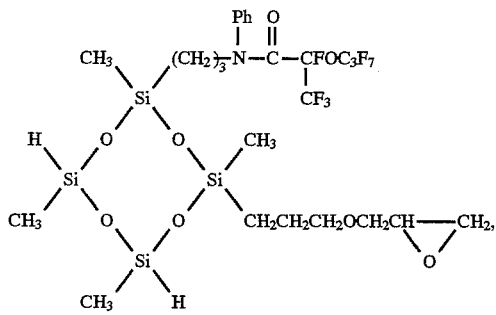

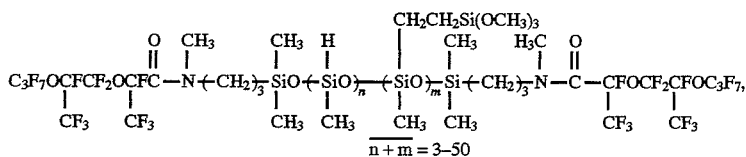

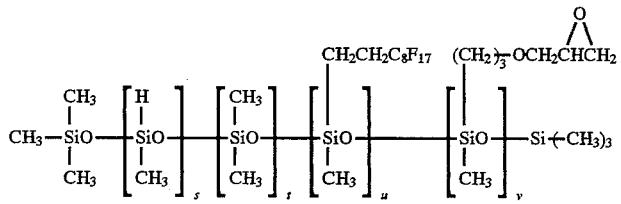

(s, u and v are positive integers, t is an integer inclusive of 0.).

Preferably 0.1 to 20 parts by weight, especially 0.3 to 10 parts by weight of organosiloxane (D) is blended per 100 parts by weight of fluorinated amide compound (A). Less than 0.1 part of organosiloxane (D) is ineffective for improving adhesion whereas more than 20 parts of organosiloxane (D) would often retard curing and adversely affect the physical properties of cured products.

It is noted that the amount of component (B) blended is determined by taking into account not only component (A), but also component (D). Therefore, the amounts of components (B) and (D) blended are such that 0.5 to 5 mol of a hydrosilyl (SiH) group may be present per mol of an aliphatic unsaturated group (e.g., vinyl, allyl and cycloalkenyl) in the entire composition.

Various additives may be added to the curable composition of the invention in order to enhance its practical usage. Useful additives include polysiloxanes containing a $CH_2=CH(R)SiO$ unit wherein R is hydrogen or a substituted or unsubstituted monovalent hydrocarbon group (see JP-B 10947/1973) and acetylene compounds (see U.S. Pat. No. 3,445,420 and JP-B 3774/1979), which are added for the purpose of controlling the curing rate of the curable composition, and ionic compounds of heavy metals (see U.S. Pat. No. 3,532,649).

Moreover, fillers may be blended in the curable composition of the invention for the purposes of reducing thermal shrinkage upon heating, reducing the coefficient of thermal expansion of elastomers as cured, improving thermal stability, weather resistance, chemical resistance, flame retardancy and mechanical strength, and reducing gas permeability. Exemplary fillers include fumed silica, quartz powder, glass fibers, carbon, metal oxides such as iron oxide, titanium oxide, and cerium oxide, and metal carbonates such as calcium carbonate and magnesium carbonate. If desired, suitable pigments, dyes or anti-oxidants may also be added.

Any desired method may be used in preparing the curable composition according to the invention. The composition can be prepared simply by kneading the above-defined components. The curable composition as kneaded can be cured at room temperature depending on the type of functional group in the fluorinated amide compound as the first essential component and the type of catalyst as the third essential component. Preferably the composition is cured by heating at 100° to 200° C. for several minutes to several hours.

On use, the curable composition of the invention may be dissolved in suitable fluorinated solvents such as metaxylene hexafluoride and fluorinates to a desired concentration depending on its application and purpose.

The curable composition of the invention may be used in a variety of applications. Cured products resulting from the curable composition exhibit satisfactory solvent resistance, chemical resistance, heat resistance, low-temperature properties, and low moisture permeability and firmly bond to substrates such as metals and plastics by brief heating at relatively low temperature. Thus the cured products or elastomers are useful for bonding of electric and electronic parts and as building sealants and automotive rubber materials.

EXAMPLE

Examples of the present invention are given below by way of illustration and not by way of limitation. Note that Me is methyl. All parts are by weight.

Example 1

To 100 parts of a polymer of the following formula (9) having a viscosity of 4,400 centistokes at 25° C., an average molecular weight of 16,500 and a vinyl content of 0.013 mol/100 g was added 10 parts of fumed silica having a specific surface area of 300 m²/g and treated with trimethylsiloxy group. They were mixed, heat treated, and milled on a three-roll mill. To the compound were further added 2.7 parts of a fluorinated hydrogensiloxane of the following formula (10), 0.2 part of a toluene solution of a chloroplatinic acid catalyst modified with a compound of the following formula (11) (platinum concentration 1.0% by weight), 0.5 part of a 50% toluene solution of ethynyl cyclohexanol, and 1.0 part of a tackifier of the following formula (12). Mixing was continued to form a curable composition.

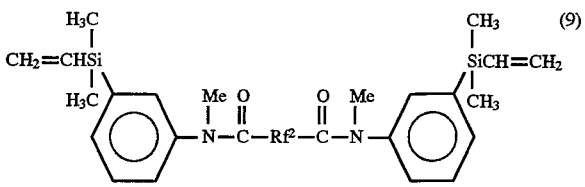

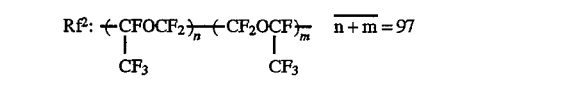

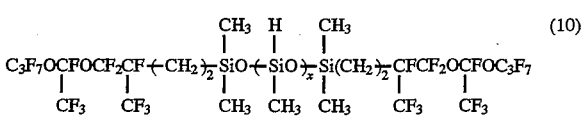

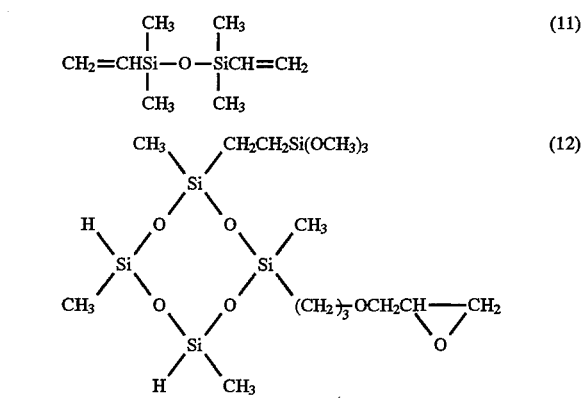

Test panels of various materials having a size 25 mm×25 mm were furnished. A pair of test panels were lap joined together through a layer of the curable composition of about 2 mm thick (overlap 10 mm). The mixture was cured by heating at 170° C. for 1 hour. The bonded test piece was subject to a shear bond test to examine a shear bond strength and percent cohesive failure. The results are shown in Table 1.

TABLE 1

| Adherend | Shear strength (kg/cm²) | Cohesive failure (%) |
| --- | --- | --- |
| Glass | 7.4 | 100 |
| Aluminum | 8.9 | 100 |
| Nickel | 7.2 | 60 |
| Chromium | 9.0 | 90 |
| Stainless steel | 8.4 | 100 |
| Polycarbonate | 7.5 | 100 |
| Polyester | 4.8 | 100 |
| Epoxy resin | 6.2 | 100 |
| Copper | 8.4 | 70 |
| Iron | 8.5 | 100 |

The cured product was examined for physical properties, finding a hardness of 41 on JIS A scale, a tensile strength of 20 kg/cm², and an elongation of 200%.

For comparison purposes, a composition was prepared by the same procedure as in Example 1 except that the compound of formula (12) was omitted. A shear bond test showed a cohesive failure of 0% for all types of test panels.

Example 2

A curable composition was prepared by the same procedure as in Example 1 except that a polymer of the following formula (13) having a viscosity of 12,200 centistokes at 25° C., an average molecular weight of 16,000 and a vinyl content of 0.013 mol/100 g was used instead of the polymer of formula (9), 16.3 parts of a compound of the following formula (14) was used as the fluorinated cyclohydrogensiloxane, and 1.0 part of a compound of the following formula (15) was used as the tackifier. A shear bond test was similarly carried out. The results are shown in Table 2.

(13)

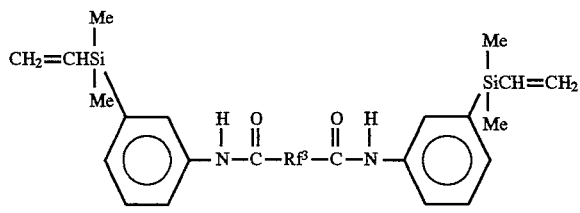

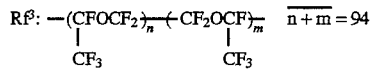

(14)

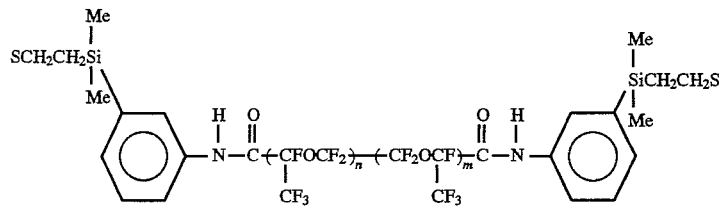

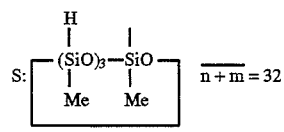

(15)

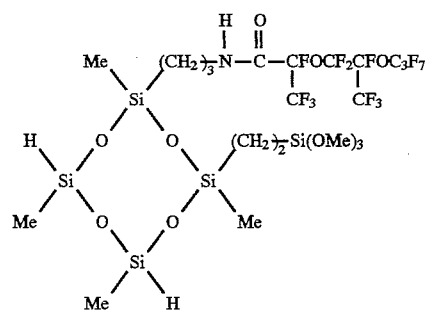

TABLE 2

| Adherend | Shear strength (kg/cm²) | Cohesive failure (%) |
|---|---|---|
| Glass | 10.6 | 100 |
| Aluminum | 12.7 | 100 |
| Nickel | 12.7 | 100 |
| Chromium | 12.7 | 90 |
| Stainless steel | 12.8 | 100 |
| Polycarbonate | 5.8 | 80 |
| Polyester | 6.6 | 100 |
| Epoxy resin | 15.2 | 100 |
| Copper | 12.8 | 100 |
| Iron | 13.2 | 100 |

The cured product was examined for physical properties, finding a hardness of 43 on JIS A scale, a tensile strength of 28 kg/cm², and an elongation of 400%.

For comparison purposes, a composition was prepared by the same procedure as in Example 2 except that the compound of formula (15) was omitted. A shear bond test showed a cohesive failure of 0% for all types of test panels.

Japanese Patent Application No. 276939/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A curable composition comprising (A) a fluorinated amide compound of the following general formula (1):

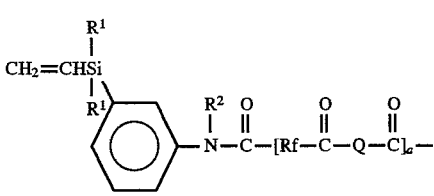

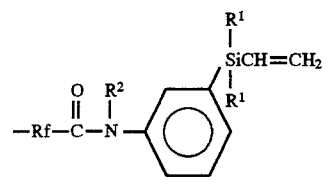

wherein $R^1$ is a substituted or unsubstituted monovalent hydrocarbon group, $R^2$ is a hydrogen atom or substituted or unsubstituted monovalent hydrocarbon group, Q is a group represented by the following general formula (2) or (3):

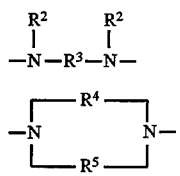

wherein

R² is as defined above, R³ is a substituted or unsubstituted divalent hydrocarbon group which may be separated by at least one of an oxygen atom, nitrogen atom and silicon atom, R⁴ and R⁵ each are a substituted or unsubstituted divalent hydrocarbon group, Rf is a divalent perfluoroalkylene or perfluoropolyether group, and letter a is an integer inclusive of 0, (B) a fluorinated organohydrogensiloxane having at least one group selected from the class consisting of a monovalent perfluorooxyalkyl, monovalent perfluoroalkyl, divalent perfluorooxyalkylene, and divalent perfluoroalkylene group, and at least two hydrosilyl groups in a molecule, (C) a catalytic amount of a platinum group compound, and (D) an organosiloxane having at least one hydrogen atom directly attached to a silicon atom and at least one of an epoxy group and a trialkoxysilyl group each attached to a silicon atom through a carbon atom or a carbon atom and an oxygen atom in a molecule, organohydrogensiloxane (B) and organosiloxane (D) being contained in such an amount that 0.5 to 5 mol of the hydrosilyl (SiH) group is available per mol of an aliphatic unsaturated group in the composition.

2. The composition of claim 1 wherein organosiloxane (D) further has at least one of a fluoroalkyl group and perfluoropolyether group each attached to a silicon atom through a carbon atom in a molecule.

3. The composition of claim 1, wherein, in formula I, R¹ and R² are independently a monovalent hydrocarbon group of 1 to 10 carbon atoms optionally substituted by halogen atoms; R³ is a divalent hydrocarbon group of 1 to 20 carbon atoms optionally substituted by halogen atoms and optionally interrupted by at least one oxygen atom, —O—, nitrogen atom in the form of —NR'— wherein R' is a hydrogen atom, an alkyl group having 1 to 8 carbon atoms or an aryl group, or silicon atom in the form of an organosilylene group or group of one of the following formulae:

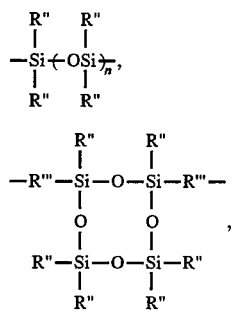

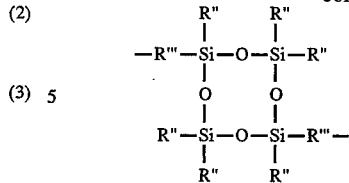

where R" is an alkyl group having 1 to 8 carbon atoms or an aryl group, R'" is an alkylene group having 1 to 6 carbon atoms or an arylene group and n is an integer of 0 to 10; R⁴ and R⁵ are independently a divalent hydrocarbon group of 1–10 carbon atoms optionally substituted by halogen atoms; R_f is a divalent perfluoroalkylene group of the formula —$C_mF_{2m}$— wherein m is an integer of 1 to 10 or a divalent perfluoropolyether group of one of the following formulae:

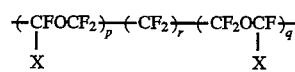

wherein X is F or CF₃ group, p, q and r are integers in the range: $p \leq 1$, $q \leq 1$, and $2 \geq p+q \geq 200$,

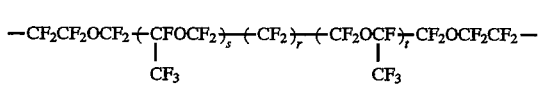

wherein r, s and t are integers in the range: $0 \leq r \leq 6$, $s \geq 0$, $t \geq 0$, and $0 \leq s+t \leq 200$,

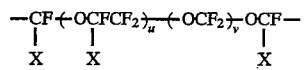

wherein X is F or CF₃ group, u and v are integers in the range: $1 \leq u \leq 20$ and $1 \leq v \leq 20$ or

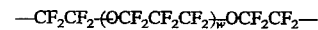

wherein w is an integer in the range: $1 \leq w \leq 100$ and letter a is 0–10.

4. The composition of claim 1, wherein the organosiloxane, (D), is of one of the following average compositional formulae:

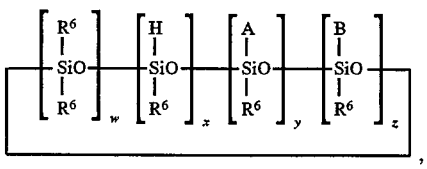

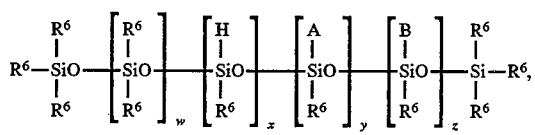

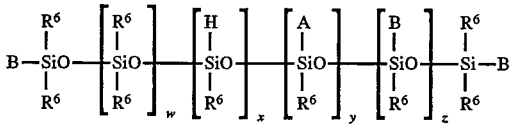

wherein R⁶ are independently substituted or unsubstituted monovalent hydrocarbon groups as previously defined for R¹, A are independently an epoxy group or a trialkoxysilyl group each attached to a silicon atom through a carbon atom or a carbon atom and an oxygen atom, B are independently a perfluoroalkyl group or perfluoroether group each attached to a silicon atom through a carbon atom, letters w, x, and z are integers inclusive of 0, y is an integer of at least 1, and the sum of w+x+y+z is 2 to about 60.

5. The composition of claim 4, wherein A are each independently

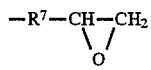

wherein $R^7$ is a divalent hydrocarbon group having 1 to 10 carbon atoms optionally containing an intervening oxygen atom, or

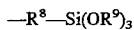

wherein $R^6$ is a divalent hydrocarbon group having 1 to 10 carbon atoms, and $R^9$ is a monovalent hydrocarbon group having 1 to 8 carbon atoms; and B are independently

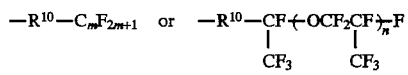

wherein $R^{10}$ is a group as defined for $R^8$ or a group represented by

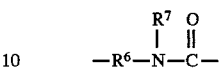

wherein $R^6$ and $R^7$ are as defined above, the letter m is 1 to 2 and n is 1 to 5.

6. The composition of claim 1, wherein the fluorinated organohydrogensiloxane, (B), is present in an mount of 0.1 to 50 parts by weight per 100 parts by weight of the fluorinated amide, (A), and the organosiloxane, (D), is present in an mount of 0.1 to 20 parts by weight per 100 parts by weight of the fluorinated amide, (A).

* * * * *